(12) United States Patent
Ryman et al.

(10) Patent No.: US 11,595,261 B2
(45) Date of Patent: *Feb. 28, 2023

(54) CONFIGURATION MANAGEMENT FOR CO-MANAGEMENT

(71) Applicant: VMware, Inc., Palo Alto, CA (US)

(72) Inventors: Paul Adam Ryman, Beecroft (AU); Maxwell Christopher Fox, Wollstonecraft (AU); Richard Jason Croft, Willoughby (AU)

(73) Assignee: VMware, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,152

(22) Filed: Oct. 25, 2021

(65) Prior Publication Data

US 2022/0045908 A1 Feb. 10, 2022

Related U.S. Application Data

(63) Continuation of application No. 16/660,198, filed on Oct. 22, 2019, now Pat. No. 11,190,403.

(51) Int. Cl.
*H04L 29/08* (2006.01)
*H04L 41/0893* (2022.01)
*H04L 67/10* (2022.01)
*H04L 41/0806* (2022.01)

(52) U.S. Cl.
CPC ...... *H04L 41/0893* (2013.01); *H04L 41/0806* (2013.01); *H04L 67/10* (2013.01)

(58) Field of Classification Search
CPC ....... H04L 63/20; H04L 63/105; H04L 63/08; H04L 63/10; H04L 41/0893
See application file for complete search history.

(56) References Cited

U.S. PATENT DOCUMENTS

| | | | |
|---|---|---|---|
| 10,986,131 B1 * | 4/2021 | Kruse | H04L 63/10 |
| 2016/0088021 A1 * | 3/2016 | Jayanti Venkata | G06F 8/60 726/1 |
| 2017/0269955 A1 * | 9/2017 | Hardy | G06F 9/45558 |
| 2020/0252468 A1 * | 8/2020 | Momchilov | G06F 9/4875 |

* cited by examiner

*Primary Examiner* — Chirag R Patel
(74) *Attorney, Agent, or Firm* — Thomas | Horstemeyer, LLP (57) ABSTRACT

Various examples for discovering policy bindings between group policy rules in a legacy management framework and unified endpoint management rules that are utilized in a modern mobile device management (MDM) device management framework. A configuration state view can allow an administrator to understand inconsistencies or conflicts between group policy rules and UEM rules.

20 Claims, 3 Drawing Sheets

CONFIGURATION MANAGEMENT FOR CO-MANAGEMENT

CROSS-REFERENCE TO RELATED APPLICATIONS

This application is a continuation of and claims the benefit of U.S. patent application Ser. No. 16/660,198, entitled "CONFIGURATION MANAGEMENT FOR CO-MANAGEMENT," and filed Oct. 22, 2019, which is hereby incorporated by reference in its entirety.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, an enterprise can require the employee to enroll with a management service capable of protecting enterprise data accessible through a device from theft, data loss, and unauthorized access. Administrators of the management service can utilize the management service to oversee operation of the devices enrolled with or otherwise managed by the service.

Various operating systems do not permit or provide capabilities for multiple management applications to exist on a single device. For instance, Group Policies enable device management by Microsoft® Active Directory capable of evaluating, deploying, and updating devices in enterprise environments. Applications like System Center Configuration Manager (SCCM) rely upon group policies that are distributed to devices by a directory service, such as Active Directory. SCCM and/or Group Policies are considered legacy management frameworks. Modern unified endpoint management (UEM) can provide additional capabilities and visibility into managed devices for administrators. UEM is also considered an extension of the mobile device management (MDM) framework that is being increasingly supported by desktop operating systems.

Coexistence of UEM and management through group policies on a device can lead to conflicts between management policies that are specified by an administrator through Active Directory and a MDM system. Identifying and resolving these conflicts can assist an administrator with administering a population of devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Aspects of the present disclosure relate to co-existence of multiple management applications on devices, identifying policies that are specified through each management framework and visualization of these policies. In some situations, it can be problematic for an administrator to maintain multiple device management frameworks on a population of devices. Many problems can arise transitioning from a legacy management application to a new management application. For instance, device management policies covered by each management application may differ. Device management policies in a legacy framework might conflict with those are specified in a modern UEM management framework. Additionally, an administrator can specify which policy should "win" or get applied to the device in the event of a conflict. While the management of conflicts can increase the difficulty in managing device policies, it can be beneficial to have two management applications co-existing on a device. For instance, if an MDM management component or management client were installed on a device having SCCM, they both might have policies that affect the same or similar functionality of the device. Therefore, if an administrator is rolling out a modern EMM or UEM management solution to a population of devices, resolving these conflicts can be problematic.

Having a complete view of the configured state of a device before deploying the configuration assists with administrator planning of a migration to an MDM solution. Instead of relying on conflict resolution mechanisms like the MDMWinsOverGP control policy, the administrator can understand or visualize which policies are in conflict, that are potentially being masked by a counterpart policy and resolve issues ahead-of-time.

Discrepancies between GP and MDM settings can manifest themselves differently on certain operating system variants that do not support a conflict control policy or implement a different set of MDM policies. This can result in inconsistent configuration states between the various versions of operating system that are deployed across a population of devices.

Figure 1:
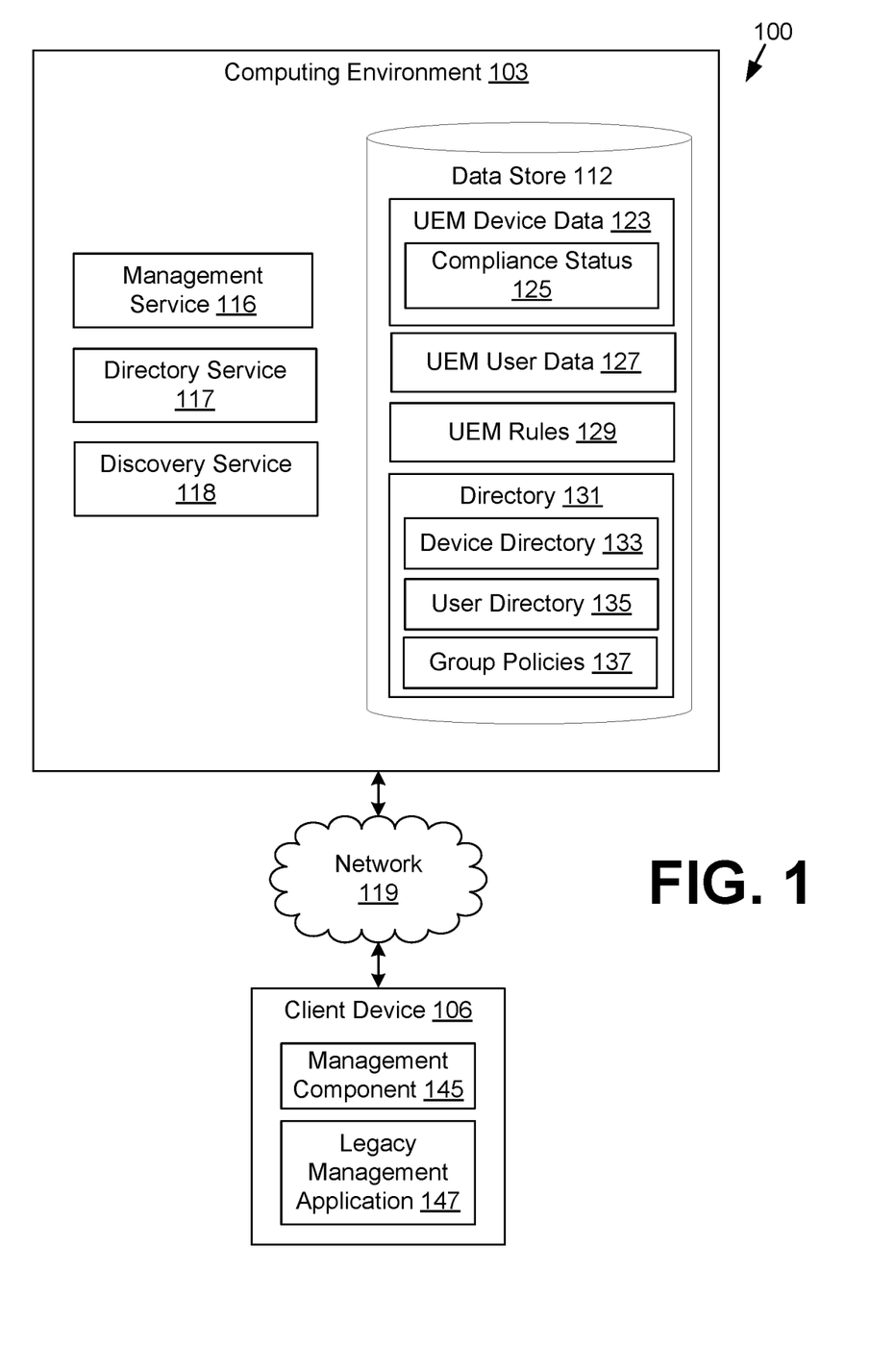
FIG. 1 is a drawing of a networked environment including a management service, an enrollment service, and a client device.

With reference to FIG. 1, shown is an example of a networked environment 100. The networked environment 100 can include a computing environment 103 and one or more client devices 106 in communication with one another over a network 119. The network 119 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 119, the computing environment 103 can be described as a "remote" computing environment 103.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 116, a directory service, a discovery service 118, as well as other applications, services, processes, systems, engines, or functionality not discussed in detail herein. The management service 116 can be executed to oversee the operation of client devices 106 enrolled with the management service 116. In some embodiments, an enterprise, such as one or more companies or other organizations, can operate the management service 116 to oversee or manage the operation of the client devices 106 of its employees, contractors, customers, or other users having user accounts with the management service 116. The management service 116 can be remotely executed from the client device 106 but manage the client device 106 through a locally executed management component 145.

The management service 116 can cause various software components to be installed on a client device 106. Such software components can include, for example, applications, resources, libraries, drivers, device configurations, or other similar components that require installation on the client device 106 as specified by an administrator of the management service 116. The management service 116 can further cause policies to be implemented on a client device 106.

Policies can include, for example, restrictions or permissions pertaining to capabilities of a client device 106 such that access to enterprise data is secured on the client device 106. For example, a policy can include providing access to enterprise data when a client device 106 is in a particular location of an office building during a predefined time window (e.g., between 9:00 AM and 5:00 PM). Also, the policy can include denying access to enterprise data when the client device 106 is not in the location of an office building or outside a time of the predefined time window. Policies can further include enabling or disabling certain functions on the client device 106. In one example, a policy can deny camera or audio recording functions when the client device 106 is at a particular location. Other policies can be implemented, as can be appreciated. The policies can be configured by the administrator depending on the interests or security policies of the enterprise.

The management service 116 can be considered a modern unified endpoint management (UEM) management framework that allows user devices to be managed using modern APIs provided by operating systems and that facilitate device management without requiring joining the device into a domain, such as an active directory domain. However, IT administrators might wish to take advantage of UEM management frameworks alongside or in addition to legacy management frameworks, which include group policy rules that are defined for a user account or a device that is joined to an active directory domain.

Accordingly, the management service 116 can interact with one or more client applications executed on the client device 106. In one example, the management service 116 interacts with a management component 145 on the client device 106 to enroll the client device 106 with the management service 116. When enrolled, the management component 145 can be registered as a device administrator of the client device 106, which can provide the management component 145 with sufficient or elevated privileges to control the operation of the client device 106. In this scenario, the management component 145, with the user's or device owner's permission, utilizes operating system capabilities that allow the device to be managed by the management component 145 on behalf of the management service 116. In one example, the management component 145 can be registered as the device administrator through the installation of a management profile at the operating system of the client device 106 that causes an operating system of the client device 106 to designate the management component 145 the device administrator.

The management service 116 can direct the management component 145 to perform device management functions on the client device 106. For example, the management service 116 can direct the management component 145 to control access to certain software or hardware functions available on the client device 106. As a result, the management service 116 can verify that the configuration and operation of the client device 106 is in conformance with predefined criteria that ensures that enterprise data, or other data, is protected from data loss, unauthorized access, or other harmful events.

The management service 116 can further provision enterprise data to the client device 106 through the management component 145. In one example, the management service 116 can cause the management component 145 to control use of the client device 106 or provision enterprise data to the client device 106 through use of a command queue provided by the management service 116. In some examples, the management service 116 can store commands in a command queue associated with a particular client device 106 and can configure the management component 145 executed by the client device 106 to retrieve the contents of the command queue. In another example, the management component 145 can be configured to retrieve the contents of the command queue on a configured interval, such as every four hours, or upon detection of a certain event, such as detection of an unauthorized application being executed by the client device 106.

In any case, the management component 145 can retrieve the contents of the command queue by checking in with the management service 116 and requesting the contents of the command queue. In one example, the contents of the command queue can include a command that the management component 145 should cause to be executed on the client device 106. In another example, the contents of the command queue can include a resource or client application that the management component 145 can cause to be installed on the client device 106, which the client device 106 may access through a specified uniform resource locator (URL).

The directory service 117 can represent an enterprise user directory such as Active Directory. The directory service 117 can authenticate and authorize users of Windows devices in a Windows domain type network. The directory service 117, in conjunction with the operating system of a client device 106 that is joined to the domain, can assign and enforce security and other usage policies on client devices 106. The directory service 117 can also facilitate management of data and peripherals that are also used and deployed within an enterprise computing environment.

The directory service 117 and operating system of a client device 106 can allow the deployment of group policy rules, or group policies 137, to client devices 106. The group policy rules can allow for control of certain aspects of a client device 106, such as VPN policies, whether a client device 106 should encrypt its mass storage resources, whether a non-administrator user has access to certain operating system settings, LAN settings, password policies, which applications are installed on the client device, whether the use can install certain applications on the client device 106, and other policies that can control, restrict, or enable certain features of the operating system of a client device 106. The directory service 117 can also be utilized to authenticate a user's access to resources within the enterprise or that are external to the enterprise if the directory service 117 operates as or in conjunction with a single sign-on (SSO) portal.

The data stored in the data store 112 can include, for example, UEM device data 123, UEM user data 127, UEM rules 129, a directory 131, as well as other data. The management service 116 includes information pertaining to management of the client devices 106 enrolled with the management service 116. To this end, the UEM device data 123 can include information about devices that are enrolled as managed devices with the management service 116. The UEM device data 123 can include identifying information about a managed device, such as a compliance status 125 of the device. The compliance status 125 indicates whether and to what extent a managed device is in compliance with one or more compliance rules, or UEM rules 129.

The UEM device data 123 can include UEM rules 129, which can be settings specified by an administrator of the management service 116 for configuration of the client devices 106. For instance, a configuration profiles specified by a UEM rule 129 can indicate particular client applications, drivers, or other software components to be installed on the client device 106. Additionally, the configuration profiles can include settings for particular operating system parameters on the client device 106. Configuration of the client device 106 can be performed by the management component 145, as specified by an applicable configuration profile. Through an administrator console, an administrator can create a configuration profile for a client device 106, a group of client devices 106, or a user group. Some client devices 106 can be configured differently than other client devices 106. In some examples, a configuration profile 145 can include an extensible markup language (XML) document, or other suitable type of file, that can be communicated to the client device 106 or otherwise accessed by the management component 145.

The UEM rules 129, also referred to as compliance rules, can include constraints specified by an administrator for a client device 106 to be in "compliance" with the management service 116. The UEM rules 129 can include criteria specified by the administrator or other criteria. In one example, the management component 145 can configure hardware or software functionality of a client device 106 such that the client device 106 is in conformance with the compliance rules 148. For instance, an administrator can specify particular types of software updates that are automatically installed on the client devices 106. Additionally, the management component 145 can identify when the client device 106 is not in conformance with the UEM rules 129, as well as other policies, and can take appropriate remedial actions, such as denying access to enterprise data, denying installation of a software update, or other features of the management component 145.

In some examples, the management service 116 communicates with the management component 145 on the client device 106 to determine whether vulnerabilities exist on the client device 106 that do not satisfy compliance rules 148. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications, or others.

The directory 131 can comprise the data supporting a directory such as active directory. The directory 131 can include a device directory 133, a user directory 135, and group policies 137 that can be associated with a user or a device. The device directory 133 can identify devices that are joined to a directory domain associated with the directory service 117. The device directory 133 can include identifying information about the device as well as potentially a user with which a device is linked.

The user directory 135 can identify users that are members of a directory. The user directory 135 can identify resources with an enterprise that a user has access to as well as credentials of the user and other security-related data associated with a user account. The user directory 135 can also identify groups within the directory of which a user is a member, which can define which group policies 137 that are applicable to the user.

Group policies 137 define rules and policies under a legacy management framework, such as through a directory service like Active Directory, that can be applied to users or client devices 106 that are members of a particular directory domain. The group policies 137 can be specified within the directory 131 and distributed to client devices 106 over the network 119. The group policies 137 can then be enforced on the client device 106 by a legacy management application 147, which can be Active Directory or SCCM.

Because the directory service 117 and the management service 116 both allow the definition of rules, policies, and restrictions on a client device 106, conflicts or inconsistencies can arise between the two. Additionally, legacy group policies 137 that are associated with a directory service 117 can make migration to a UEM management framework provided by the management service 116 cumbersome for administrators. In one scenario, an operating system can be equipped with a conflict resolution policy that allows an administrator to instruct the operating system to enforce a UEM rule 129 over a group policy 137 if they conflict, or vice-versa. To activate this conflict resolution policy in the case of Windows 10, the administrator can enable the MDMWinsOverGP policy for a client device 106 or for a particular UEM rule 129 or for multiple UEM rules 129.

Therefore, the discovery service 118 can provide a discovery and visualization tool for administrators that discovers group policies 137 as well as UEM rules 129 that are applicable to a particular user and device. The discovery service 118 can also discover group policies 137 and UEM rules 129 that are applicable to groups of users or groups of devices. The discovery service 118 can identify policy bindings that link together group policies 137 that are defined with UEM rules 129 that the management service 116 has the capability to define. Creating policy bindings requires a reference policy binding which is a combination of mapping data structures, rules and functionality that describe how each group policy maps to UEM rules, and vice versa. Given the large number, variety and complexity of settings covered by each management application, this scope of policy bindings is large and complex. The policy bindings can be presented in a list, matrix, or visually so that the administrator can view and resolve potential inconsistencies between group policies 137 and UEM rules 129.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system that can execute various applications, such as the management component 145, a legacy management application 147, or other application. The client device 106 can also include drivers, such as device drivers or software drivers, that operate or control hardware devices coupled to the client device 106 or software installed thereon. The operating system can allow the legacy management application 147 and the management component 145 to effectively co-manage the client device 106. The operating system can also allow the administrator to specify, with respect to certain group policies 137 enforced by the legacy management application 147, whether the legacy management application 147 or the management component 145 takes precedence in the event of a conflict between a group policy 137 and a UEM rule 129.

Next, a general description of the operation of the various components of the networked environment 100 is provided. In some situations, an enterprise may desire to transition from a legacy management framework to a UEM management framework. For instance, an enterprise may desire to phase out use of a legacy management application 147 in favor of a management component 145 that manages client devices 106. Removing the legacy management application 147 from a client device 106 and installing a management component 145 can be challenging because the administrator might be reluctant to do so in view of unintended consequences. For example, removing the SCCM framework from the device might break functionality such as printing for a population of users. Additionally, the client device 106 can be vulnerable during the transition or due to complexities associated with the different policies implemented by the legacy management application 147 versus the management component 145. Accordingly, it can be beneficial to have both the legacy management application 147 and the management component 145 co-existing on the client device 106 while use of the legacy management application 147 is phased out.

However, certain group policies 139 might conflict with UEM rules 129 that are defined for a particular user and device. Therefore, the discovery service 118 can generate a configuration state view of the user and device that displays group policies 137 along with UEM rules 129 that affect common features or properties of the operating system of the client device 106. Additionally, the configuration state view can display group policies 137 along with UEM rules 129 that affect common features or properties of the operating system of a population of client devices 106. The population of client devices 106 can be identified based on membership in a particular group of users or devices from the directory 131. For example, a configuration state view of a population of users and/or devices corresponding to users in a group can be generated by the discovery service 118. As an alternative example, a configuration state view of a population of users and/or devices corresponding to devices in a particular group can be generated by the discovery service 118.

The configuration state view can identify inconsistencies of conflicts between group policies 137 and UEM rules 129 that correspond to a particular user and device combination. The administrator can in turn identify and resolve these inconsistencies before migration of a population of client device 106 to management under the management service 116 or implementation of co-management scenario where the devices are managed by the management component 145 on behalf of the management service 116 as well as the legacy management application 147 on behalf of the directory service 117 or other legacy operating system management capabilities.

Figure 2:
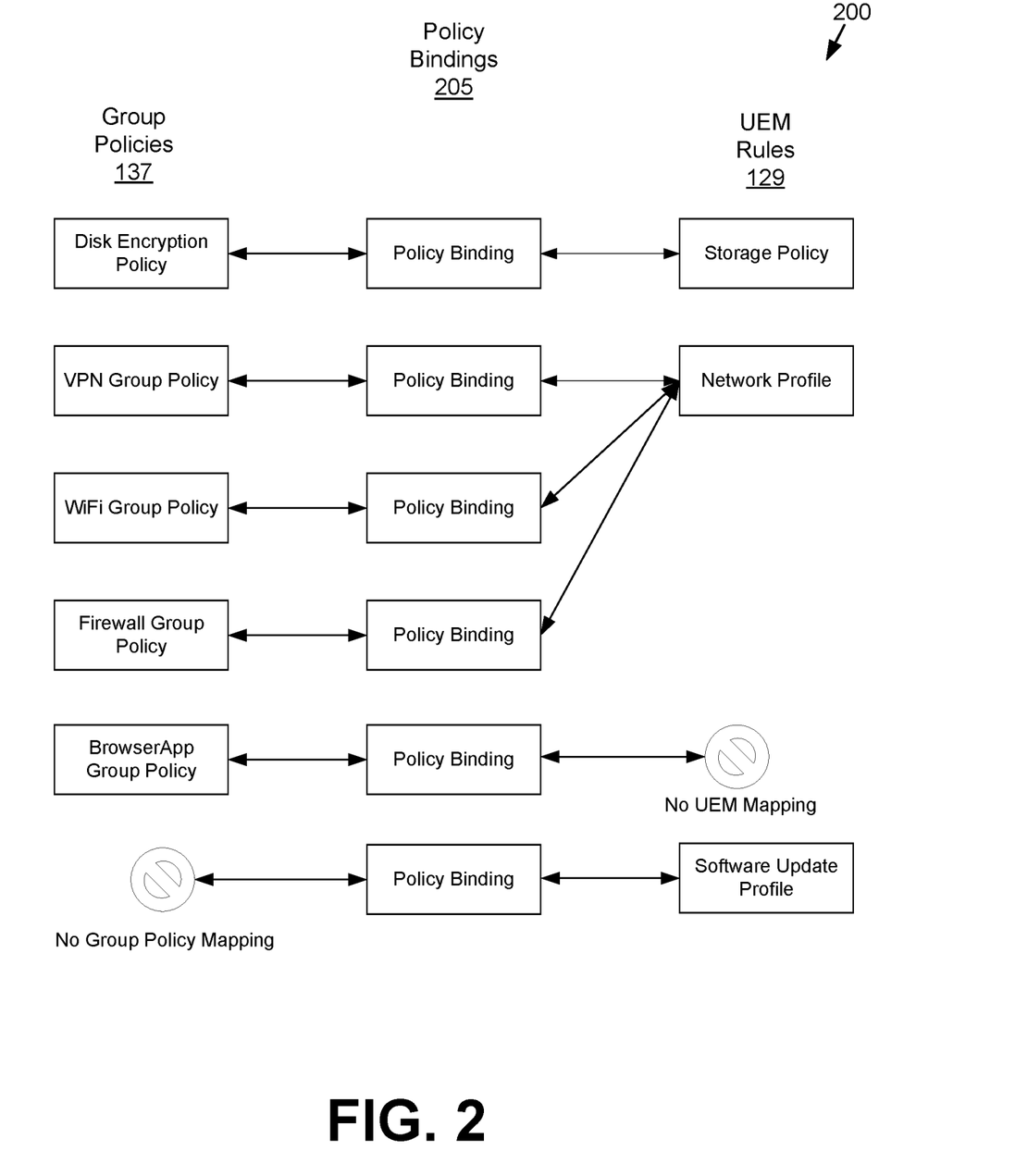
FIG. 2 is a drawing of a configuration state view according to various examples of the disclosure.

Referring next to FIG. 2, shown is an example configuration state view 200 that can be generated by the discovery service 118. The configuration state view 200 can be generated by the discovery service 118 and displayed to an administrator in a management console user interface. In addition to visualizing the configuration state view 200, it can also provide rich reporting and compliance functionality. Compliance violations can be surfaced as alerts to the administrator, or through an automated remediation or security-related action, such as preventing a client device 106 from accessing enterprise resources. The user interface can provide an interactive view of the configuration state view 200 such that the administrator can view the values associated with a particular group policy 137 or UEM rule 129 by clicking or tapping on one of the rules or policies that are shown in the configuration state view 200.

The configuration state view 200 as depicted in FIG. 2 shows group policies 137 associated with a particular combination of a user and device that are managed by the legacy management application 147. The configuration state view 200 also shows UEM rules 129 that are associated with a user and device that are managed by the management component 145 on behalf of the management service 116. The configuration state view 200 can also indicate policy bindings 205 that cause an application, configuration profile (e.g., a VPN profile), that is different from or in addition to a respective application or profile indicated by a particular UEM rule 129 or group policy 137.

The policy bindings 205 can be stored in a data structure that is linked to a combination of a particular user and device or a particular population of users and devices. The policy bindings 205 can be based upon a reference policy binding that identifies one or more group policies 137 with one or more UEM rules 129. The reference policy bindings can be adjusted over time as additional group policies 137 or additional UEM rules 129 are created and/or utilized by an operating system vendor.

The policy bindings 205 shown in the configuration state view 200 can also alert an administrator to inconsistencies or conflicts between one or more UEM rules 129 and group policies 137. The policy bindings 205 can warn an administrator that a UEM rule 129 and/or a group policy 137 are configured to set conflicting or differing values for a particular operating system setting.

The policy bindings 205 can link together multiple group policies 137 with a single or multiple UEM rules 129. Likewise, the policy bindings 205 can link together multiple UEM rules 129 with a single or multiple group policies 137. Additionally, the policy bindings 205 can link a group policy 137 with no corresponding UEM rule 129. Similarly, the policy bindings 205 can link a UEM rule 129 with no corresponding group policy 137. A configuration state view 200 can present the policy bindings 205 to an administrator in a user interface or report to give an administrator a visualization of group policies 137 relative to UEM rules 129 to enable more informed migration or co-management.

Figure 3:
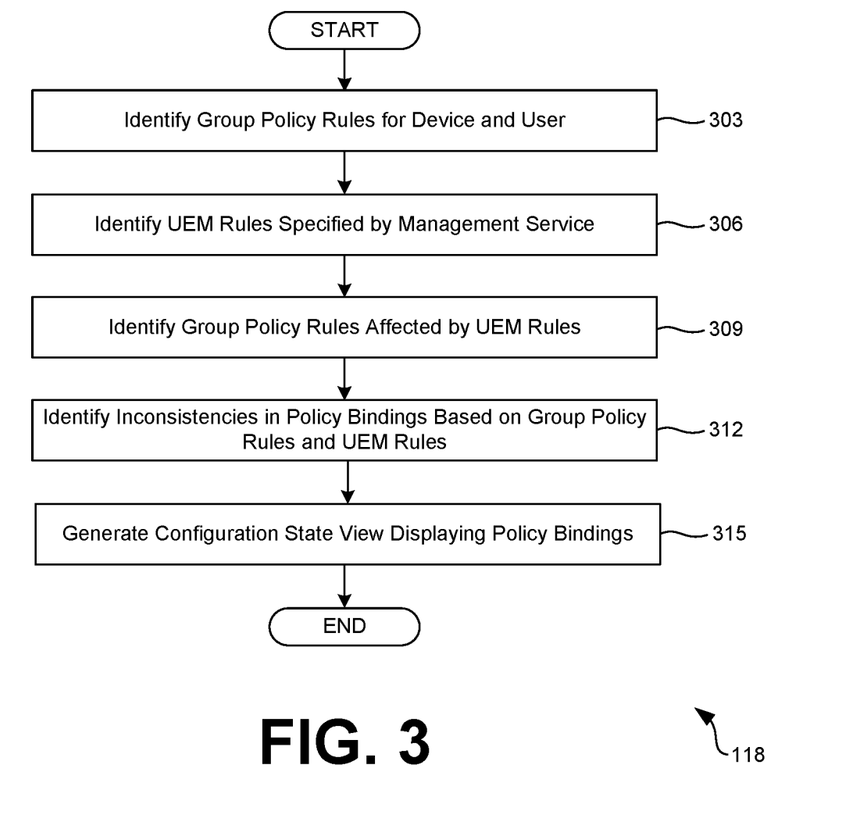
FIG. 3 is a flowchart illustrating functionality implemented by components of the networked environment.

Moving on to FIG. 3, shown is a flowchart that provides one example of the operation of a portion of the discovery service 118 to generate a configuration state view 200 or discover policy bindings 205 that link together a user and device. The flowchart of FIG. 3 can be viewed as depicting an example of elements of a method implemented by the discovery service 118 or other suitable software component according to one or more examples. The separation or segmentation of functionality as discussed herein is presented for illustrative purposes only.

In step 303, the discovery service 118 can identify group policies 137 or group policy rules that apply to a particular device and/or user for which the discovery service 118 is generating a configuration state view 200. The discovery service 118 can be granted access to the directory 131 by the directory service 117 to discover information about users, devices, and group policies 137 defined in the directory 131. The discovery service 118 can access the directory 131 in response to an administrator initiating a discovery process and identifying one or more of a user and client device 106 for which the administrator wishes to generate a configuration state view 200. The discovery service 118 can retrieve the group policies 137 that are applicable to the user and device to later generate a configuration state view that links together applicable UEM rules 129 with the group policies 137.

At step 306, the discovery service 118 can identify UEM rules 137 that are applicable to the client device 106 and/or the user associated with the device. The UEM rules 137 applicable to the device can be obtained from the management service 116 by requesting access to the rules and profiles that are enforced on the client device 106 by the management component 145. Again, the management component 145 can enforce compliance rules, install application and profiles, change operating system settings, and perform other actions on the client device 106 on behalf of the management service 116. Accordingly, the discovery service 118 can identify the UEM rules 129 that define the configuration profiles, applications, operating systems settings, and other aspects of a client device 106 that are managed by the management service 116.

At step 309, the discovery service 118 can identify the group policies 137 that are affected by the UEM rules 129 detected at step 306. As noted above, the discovery service 118 can generate policy bindings 205 that link together one or more UEM rules 129 with one or more group policies 137. The policy bindings 205 can be generated based upon reference policy bindings that specify which UEM rules 129 should be linked to particular group policies 137. If the discovery service 118 detects that a particular UEM rule 129 or group policy 137 is defined, the discovery service 118 can establish a policy binding 205 for the definition. The discovery service 118 can then determine whether any other UEM rules 129 or group policies 137 are mapped by the policy bindings 205 generated from reference policy binding.

At step 312, the discovery service 118 can identify inconsistencies or conflicts between UEM rules 129 and group policies 137 that are linked by a policy binding 205. The discovery service 118 can identify a conflict by identifying policy bindings 205 that result in an inconsistent operating system setting on a client device 106. The discovery service 118 can also identify a conflict by identifying policy bindings 205 that result in a different version of a particular application or configuration profile to be installed on a client device 106. Additionally, the discovery service 118 can further identify a conflict in a policy binding 205 by utilizing or applying a logical test that is embedded within the definition of the policy binding 205. For example, a policy binding 205 can define a particular operating system setting and an expected value for the setting, taking into account whether the group policy 137 corresponding to the policy binding 205 specifies that the group policy 137 or UEM rule 129 should win in the event of a conflict.

At step 315, the discovery service 118 can generate the configuration state view 200 based upon the policy bindings 205 created at step 309 to associate UEM rules 129 with group policies 137. The configuration state view 200 can allow an administrator to view policy bindings 205 as well as potential inconsistencies and conflicts between the UEM rules 129 and group policies 137. The configuration state view 200 can also allow the administrator to resolve conflicts between UEM rules 129 and group policies 137 by providing a link to an editing user interface in which either can be edited to resolve the conflict.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the discovery service 118, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 116, the discovery service 118, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying program code executable in a computing device that, when executed by the computing device, causes the computing device at least:
   identify a combination of a user and a device that is enrolled as a managed device with a remotely executed management service;
   identify a plurality of group policy rules defined for the user and the device, the group policy rules defined in a directory service;
   identify a plurality of unified endpoint management (UEM) rules defined by the remotely executed management service for the user and the device;
   identify ones of the group policy rules that have at least one an analog from the UEM rules;
   build a configuration state view of the user and the device, the configuration state view identifying group policy rules and UEM rules that affect the same functionality of the device; and
   identify inconsistencies between the group policy rules and the UEM rules.

2. The non-transitory computer-readable medium of claim 1, wherein the program code identifies inconsistencies by determining that a UEM rule and a compliance rule specify a conflicting setting for a feature of the device.

3. The non-transitory computer-readable medium of claim 1, wherein the UEM rules are enforced by a management component installed on the client device, and the management component comprises an application installed on the client device with elevated privileges and registered as a local device administrator with an operating system of the client device.

4. The non-transitory computer-readable medium of claim 1, wherein the group policy rules are defined in a directory service associated with the user or the device, and the group policy rules specify settings within an operating system of the client device.

5. The non-transitory computer-readable medium of claim 1, wherein the program code identifies ones of the group policy rules that have at least one analog from the compliance rules by inconsistencies by determining that the at least one analog from the compliance rules affects the same operating system setting as one of the group policy rules.

6. The non-transitory computer-readable medium of claim 1, further comprising program code that, when executed by the computing device, causes the computing device to generate a plurality of policy bindings that link together the UEM rules and the group policy rules.

7. The non-transitory computer-readable medium of claim 1, wherein program code identifies inconsistencies between the group policy rules and the UEM rules by identifying that at least one of a group policy rule or a UEM rule specifies a conflicting value for an operating system setting on the client device.

8. A system comprising:
at least one computing device comprising a processor; and
program instructions executable in the computing device that, when executed by the computing device, cause the client device to:
identify a combination of a user and a device that is enrolled as a managed device with a remotely executed management service;
identify a plurality of group policy rules defined for the user and the device, the group policy rules defined in a directory service;
identify a plurality of unified endpoint management (UEM) rules defined by the remotely executed management service for the user and the device;
identify ones of the group policy rules that have at least one an analog from the UEM rules;
build a configuration state view of the user and the device, the configuration state view identifying group policy rules and UEM rules that affect the same functionality of the device; and
identify inconsistencies between the group policy rules and the UEM rules.

9. The system of claim 8, wherein the program code identifies inconsistencies by determining that a UEM rule and a compliance rule specify a conflicting setting for a feature of the device.

10. The system of claim 8, wherein the group policy rules are defined in a directory service associated with the user or the device, and the group policy rules specify settings within an operating system of the client device.

11. The system of claim 8, wherein the UEM rules are enforced by a management component installed on the client device, and the management component comprises an application installed on the client device with elevated privileges and registered as a local device administrator with an operating system of the client device.

12. The system of claim 8, wherein the program code identifies ones of the group policy rules that have at least one analog from the compliance rules by inconsistencies by determining that the at least one analog from the compliance rules affects the same operating system as one of the group policy rules.

13. The system of claim 8, further comprising program code that, when executed by the computing device, causes the computing device to generate a plurality of policy bindings that link together the UEM rules and the group policy rules.

14. The system of claim 8, wherein program code identifies inconsistencies between the group policy rules and the UEM rules by identifying that at least one of a group policy rule or a UEM rule specifies a conflicting value for an operating system setting on the client device.

15. A method comprising:
identifying a combination of a user and a device that is enrolled as a managed device with a remotely executed management service;
identify a plurality of group policy rules defined for the user and the device, the group policy rules defined in a directory service;
identify a plurality of unified endpoint management (UEM) rules defined by the remotely executed management service for the user and the device;
identify ones of the group policy rules that have at least one an analog from the UEM rules;
build a configuration state view of the user and the device, the configuration state view identifying group policy rules and UEM rules that affect the same functionality of the device; and
identify inconsistencies between the group policy rules and the UEM rules.

16. The computer-implemented method of claim 15, further comprising identifying inconsistencies by determining that a UEM rule and a compliance rule specify a conflicting setting for a feature of the device.

17. The computer-implemented method of claim 15, wherein the group policy rules are defined in a directory service associated with the user or the device, and the group policy rules specify settings within an operating system of the client device.

18. The computer-implemented method of claim 15, wherein the UEM rules are enforced by a management component installed on the client device, and the management component comprises an application installed on the client device with elevated privileges and registered as a local device administrator with an operating system of the client device.

19. The computer-implemented method of claim 15, wherein the program code identifies ones of the group policy rules that have at least one analog from the compliance rules by inconsistencies by determining that the at least one analog from the compliance rules affects the same operating system as one of the group policy rules.

20. The computer-implemented method of claim 15, wherein program code identifies inconsistencies between the group policy rules and the UEM rules by identifying that at least one of a group policy rule or a UEM rule specifies a conflicting value for an operating system setting on the client device.

\* \* \* \* \*